March 24, 1970   G. E. RICKERT   3,502,416
SIGHTING DEVICE
Filed April 12, 1965
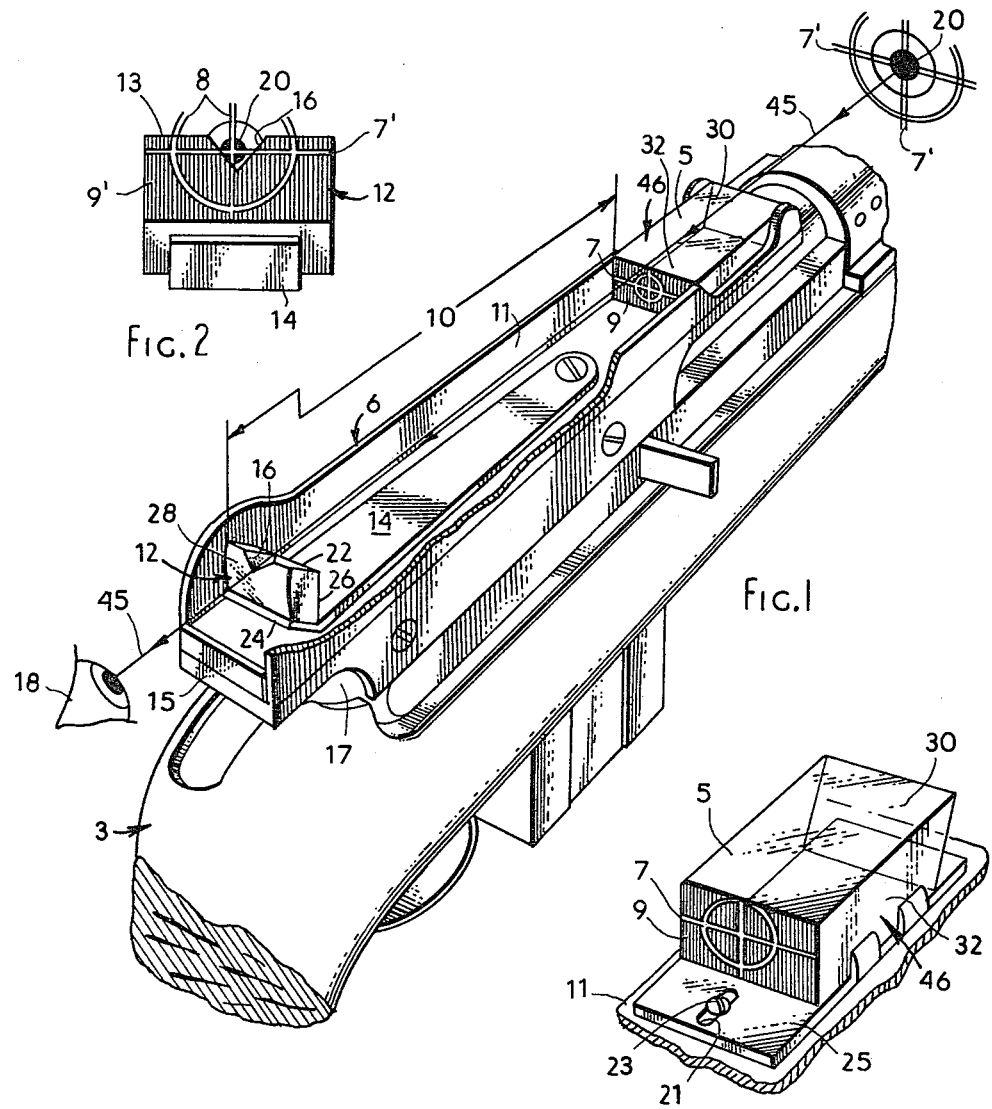
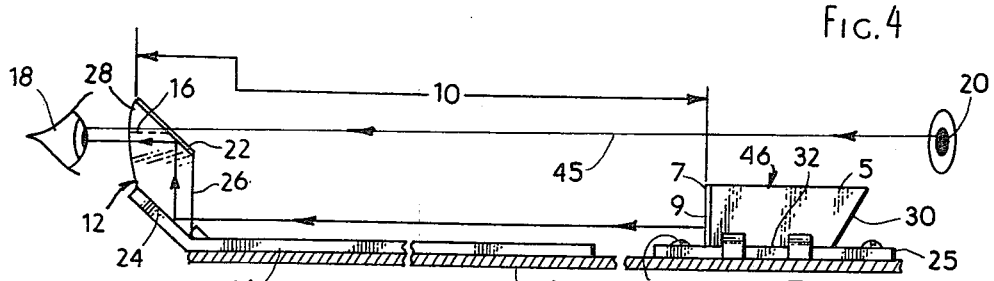
INVENTOR
GLENN E. RICKERT
by Albert L. Jeffers
Attorney United States Patent Office 3,502,416
Patented Mar. 24, 1970

3,502,416
SIGHTING DEVICE
Glenn E. Rickert, Community State Bank Bldg.,
Huntington, Ind. 46750
Continuation-in-part of application Ser. No. 356,403,
Apr. 1, 1964. This application Apr. 12, 1965, Ser.
No. 447,483
Int. Cl. G02b 23/10
U.S. Cl. 356—251         1 Claim

ABSTRACT OF THE DISCLOSURE

An optical sighting device is disclosed which includes a rear sighting element consisting of a periscopic optical element; and a front sighting element consisting of light transmitting indicia on an otherwise opaque and darkened face. The face is lighted from behind by a fluorescent material which in turn is energized by ambient incident light causing the indicia to appear in a vivid contrasting color to an observer. The front sighting element is viewed through the periscopic optical element while a target is viewed over an edge of the periscopic optical element, thus allowing the user to superimpose target and indicia for the purpose of aligning the sight.

---

This invention relates to optical sights for use on firearms and other equipment requiring accurate sighting.

This application is a continuation-in-part of my copending application, Ser. No. 356,403, entitled "Compact Optical Sight," filed Apr. 1, 1964, which in turn was a continuation-in-part of application Ser. No. 2701, filed Jan. 15, 1960, and now abandoned.

Heretofore several collimating sights have been presented for use on small arms, but each of them have had one or more troublesome characteristic which prevented their being generally acceptable to the trade.

For example, some previous sights, by their basic designs, have seriously reduced the brightness of the target such as to render them inoperative in dim light. Some prior art sights do not have sighting elements of sufficient brightness or discernability to be effective for hunters or combat forces under the dim lighting and adverse background conditions with which they are frequently confronted.

The primary object of this invention is to provide a sighting element having indicia which when illuminated only by incident light, is highly discernible in either bright or dim light, and against light or dark backgrounds.

A further object of this invention is to provide a sighting device which has the accuracy of the sharply focused and parallax-free reticle of the telescopic sight but which is more compact, and which has a wider field of view than the telescopic sight.

Another object of the invention is to provide a sighting device which gives simultaneously precise elevation and windage information without unduly limiting the observer's eye to one exact observation position.

An important object of one form of the invention is to provide a practical sighting device which permits the observer while sighting, to employ when desired, the full area of the pupil of his eye to see the target on a line of sight which is unrestricted in brightness so that he may successfully see a more dimly lighted target.

A salient object of the invention is to provide a twilight sighting device which for example is effective in sighting a gray squirrel on a gray tree in a dense woods on a gray day at dusk.

A special object of the invention is to provide a sighting device having a rear optical surface which can be angled to avoid reflections from the sky and clouds getting into the shooter's eye.

Other objects and advantages will be apparent as the following specifications and drawing are studied, wherein:

FIGURE 1 is a fragmentary perspective view of a rifle provided with the sighting device according to the invention;

FIGURE 2 illustrates the observer's view of the sight indicia along the line of sight;

FIGURE 3 is a fragmentary side view of the sight with the modified front sight element; and FIGURE 4 is a perspective view of the front sight element showing a modified form of the element mounting.

Referring now to FIGURE 1 of the drawing, the sight 6 has a frame 11 attached to a base 15 which in turn is secured to the receiver 17 of a conventional rifle 3. The dark faced reticle 9 has transparent or translucent lines or indicia 7, and is adapted to be illuminated from the rear by the reticle illuminator 5. It is to be understood that the dark faced reticle includes a colored face which contrasts with the indicia color. For most uses a dull black color is preferred.

A periscopic and collimating optic 12 having plus focus power and a line of sight deviating effect is held in position by an adjustment blade 14 attached to the frame 11 of the sight 6. The lens surface 28 is positioned essentially at its focal length distance designated by the reference number 10 from the reticle indicia 7 of the reticle 9. The eye 18 of the observer looks through the notch 16 of the optic 12 toward the distant target 20 (substantially at infinity) to see a reticle indicia image 7' at the target 20, parallax-free with the target 20 and in focus with the target 20. The edge of the optic 12 can be made to split the effective pupil area of the eye 18 and as a result the recticle indicia image 7' seen through the optic 12 can be made to actually superimpose on the target 20 which is seen down the line of sight 45 through the notch 16. Reticle indicia image 7' as illustrated in FIGURE 2 is shown extending beyond the edge of the optic 12, and is designated by the reference number 8. It is shown superimposed on the target 20.

Referring to FIGURE 4, the front sight element 46 is shown with a modification. The element is attached to an adjustable base 25 which has an elongated adjustment screw slot 21 and locking screw 23. The locking screw 23 when tightened serves to secure the front sight assembly to the floor portion of the frame 11. A similar slot (not shown) and locking screw may be provided at the other end of the adjustable base 25. The adjustment system permits a small variation from the distance designated by the reference number 10, FIGURE 1. This adjustment permits relocating the reticle indicia 7 so that it appears in focus and parallax-free with the target when the target is at other than infinity. The optic 12 could be made adjustable instead of the element 46.

In the preferred form, the illuminator 5 is made of optical material perferably yellow to red to contrast with the green colors of nature, and which contains colored or fluorescent particles. Surface 32 can be provided with a reflective surface or backing to aid brightness. The angled end 30 reflects, by total internal reflection principles, overhead incident light toward the reticle indicia 7 aiding its illumination, while light from the general direction of the target passes through the angled end 30 and travels toward the reticle indicia to also aid the illumination. Incident light passes into the optical material to strike fluorescent particles which fluoresce in all directions but many of the rays are internally reflected by the surfaces of the illuminator 5 to travel toward the reticle indicia 7 for illumination purposes. If desired, the illuminator 5 can contain colored material along with or instead of the fluorescent material. Colored filters may be employed.

The end 30 (angled or otherwise shaped) preferably is left uncoated and unshielded, so that the illuminator will receive light from the direction of the target when it is aimed from a cavelike structure.

Referring again to FIGURES 1 and 2, the periscopic effect of the optic 12 causes an image 7' of the reticle indicia 7 to appear displaced upward from the reticle 9 so that the reticle 9 is not in the way of the line of sight 45 to the target 20.

The indicia image 7' is seen through the edge of the collimating optical surface 28 in a parallax-free manner with the infinity located target 20, and in focus with the target 20 because the front sight is located forward from the collimating optical surface 28 at a distance substantially equal to the focal length of the collimator.

It should be noted in FIGURE 2 that the image 7' of the reticle lines or indicia are shown off of the center of the notch to illustrate the advantage of the parallax-free nature of this sight. When the parallax-free reticle image 9' and indicia image 7' are alternately sighted high in the notch 16, low in the notch, to one side in the notch or even over the top of edge 13, the sight will still indicate the same precise point of aim. The above description illustrates that the sight is parallax-free and as such the observer's eye is not restricted to one precise position in sighting. Thus it is demonstrated that any position from which the reticle lines can be seen is a perfect and accurate sighting position. Furthermore, the horizontal and verticle reticle lines do not need to be seen as intersecting each other. They need to be seen only sufficiently to permit the observer knowing where they would intersect if they were extended. The apparent intersection point is the precise point of aim, the same as when the intersection point is actually seen.

A further understanding of the invention may be had by studying FIGURE 3, where the eye 18 looks through the notch 16 to the target 20. Light from the reticle indicia 7 passes through surface 26 of the periscopic prism, reflects from opaque reflective surfaces 24, 22 and is focused by the refracting surface 28 to enter the observer's eye 18. The periscopic and collimating (focusing) optic 12 thus causes an image of the indicia to appear parallax-free with and in focus with the distant target 20. The collimating surface 28 could of course be located at surface 26, or in fact anywhere convenient between surface 28 and the indicia 7.

A pair of reflecting mirrors, or right angle prisms may be substituted for the one piece periscopic prism. This periscopic type line of sight deviator permits the refracting surface 28 to be tilted in at the bottom (away from the eye 18 at the bottom) to prevent the surface 28 from reflecting overhead light (sky light) into the shooter's eye.

If desired, a solid bar or a continuous piece of optical material can fill the space 10 between the collimating surface 28 and the reticle 9 leaving the rear lens surface the only optical surface exposed to possible dirt or other contamination. Surfaces 22 and/or 24 can be adapted to do the collimating, instead of surface 28.

Those acquainted with the art will readily understand that the invention wherein set forth is not necessarily limited and restricted to the precise and exact details presented and that various changes and modifications may be resorted to without departing from the spirit of my invention. Accordingly, applicant does not desire to be limited to the specific details described herein, primarily for purposes of illustration, but instead desires protection falling within the scope of the appended claims.

Having thus described the various features of the invention, what I claim as new and desire to secure by Letters Patent is:

1. A sighting device comprising:
    a reticle provided with a darkened face, said reticle having horizontal and vertical information light transmitting indicia adapted to be illuminated from the rear side of said reticle face, an illuminator positioned adjacent to the rear side of said reticle face, said illuminator adapted to receive incident light, said illuminator being in the form of a block of semi-transparent material having fluorescent material therein which emits colored light when activated by incident light, said illuminator positioned to receive ambient illumination to cause said fluorescent material to emit colored fluorescent light for the purpose of making the indicia of said reticle discernible to an observer, refractive collimating means for providing an image of the indicia of said reticle to appear substantially in the focal plane of the target, and periscopic means comprising a pair of opaque reflecting surfaces, a first of which is provided with a notch in its upper edge, said notch being positioned on the line of sight to the target, and said first surface being obliquely angled to said line of sight to the target, the second of said reflecting surfaces being positioned below said line of sight to the target and substantially parallel to said first surface so as to direct the line of sight from said reticle to said first reflective surface, so that said image of said reticle can be aligned with the target sighted beyond the edge of said periscopic means without said reticle interfering with the view of the target.

References Cited

UNITED STATES PATENTS

| 683,203 | 9/1901 | Grubb. | |
| 2,472,809 | 6/1949 | Decker. | |
| 3,121,163 | 2/1964 | Rickert | 250—77 |
| 3,320,671 | 5/1967 | Rickert et al. | 250—77 XR |
| 2,659,665 | 11/1953 | Parsons et al. | |
| 2,780,130 | 2/1957 | Mauer | 88—2.3 |

FOREIGN PATENTS

| 659,044 | 4/1938 | Germany. |
| 719,592 | 5/1942 | Germany. |

RONALD L. WIBERT, Primary Examiner

O. B. CHEW II, Assistant Examiner

U.S. Cl. X.R.

350—10